United States Patent
Chiu

(10) Patent No.: US 9,800,173 B1
(45) Date of Patent: Oct. 24, 2017

(54) RECTIFICATION CIRCUIT FOR USING IN ALL TYPES OF LINEAR AND NONLINEAR INPUT AND LOADING

(71) Applicant: LEAD YEAR ENT. CO., LTD., Taipei (TW)

(72) Inventor: Ta-Ping Chiu, Taipei (TW)

(73) Assignee: Lead Year Ent. Co., Ltd., Taipei (TW)

( * ) Notice: Subject to any disclaimer, the term of this patent is extended or adjusted under 35 U.S.C. 154(b) by 0 days.

(21) Appl. No.: 15/407,400

(22) Filed: Jan. 17, 2017

(51) Int. Cl.
*H02M 7/219* (2006.01)
*H02M 1/08* (2006.01)
*H02M 1/32* (2007.01)
*H02M 1/00* (2006.01)

(52) U.S. Cl.
CPC ............. *H02M 7/219* (2013.01); *H02M 1/08* (2013.01); *H02M 1/32* (2013.01); *H02M 2001/0009* (2013.01)

(58) Field of Classification Search
CPC .... H02M 1/12; H02M 1/4208; H02M 1/4233; H02M 5/4585; H02M 7/217
USPC .......................... 363/44, 52, 81, 84, 89, 125
See application file for complete search history.

(56) References Cited

U.S. PATENT DOCUMENTS

| | | | | |
|---|---|---|---|---|
| 5,790,395 A | * | 8/1998 | Hagen ..................... | H02M 1/36 323/207 |
| 2002/0089866 A1 | * | 7/2002 | Keim ..................... | H02J 7/0054 363/89 |
| 2003/0075997 A1 | * | 4/2003 | Keim ................... | B60L 11/1803 310/68 D |
| 2010/0320927 A1 | * | 12/2010 | Gray .................... | H02M 1/4208 315/250 |
| 2011/0031942 A1 | * | 2/2011 | Green ................. | H02M 1/4208 323/205 |

* cited by examiner

*Primary Examiner* — Adolf Berhane
(74) *Attorney, Agent, or Firm* — Rosenberg, Klein & Lee

(57) ABSTRACT

A rectification circuit for using in all types of linear and nonlinear input and loading includes an input voltage, a bridge rectifier circuit, a loading circuit, voltage level holding driving circuits, a current phase timing detection circuit, high-voltage side and low-voltage side driving circuits, input voltage phase timing detection circuits, a monostable circuit, and a transistor conduction control circuit. The present invention detects both voltage conduction phase of an input signal and conduction phase of a current in an overall circuit to determine the conduction time of switch elements of a bridge rectifier circuit so that with a high performance being achieved, the bridge rectifier circuit can be used in various combinations of an input signal having a random waveform and linear or nonlinear circuits to further improve utilization efficiency of power supply and reduce complication of circuit design and also to prevent erroneous operation generated by the circuit.

8 Claims, 12 Drawing Sheets

RECTIFICATION CIRCUIT FOR USING IN ALL TYPES OF LINEAR AND NONLINEAR INPUT AND LOADING

FIELD OF THE INVENTION

The present invention relates to a rectification circuit, and in particular to a rectification circuit for using in all types of linear and nonlinear input and loading.

BACKGROUND OF THE INVENTION

Improving the efficiency of a rectification circuit is an important measure of increasing circuit performance. In a power conversion circuit, due to the increase of power, the importance of conversion efficiency is continuously increased. Input signals and loadings of circuits are generally mixed up of linear and nonlinear characteristics. The conventional ways can only conduct on a switching element that is connected in parallel with a rectifier diode according to the phase of an input voltage to handle a sinusoidal wave input signal used in combination with a resistive linear loading. However, when the loading in not linear or the input signal is a direct current, the switching element that is connected with a rectifier diode would lose functionality of simply fail.

Further, the power consumption of a rectifier diode in a rectification circuit is increased with the increase of an electrical current flowing therethrough. To reduce the loss caused by the diode, a switching element, such as a metal-oxide-semiconductor field-effect transistor (MOSFET) is connected, in parallel, to two ends thereof, and the MOSFET is set on when the diode is conducted forward in order to reduce power consumption of the diode. However, the conventional rectification circuit determines if to conduct on/off the switching element according to the result of detection of the phase of an input voltage. When the loading circuit comprises a capacitive element or other non-resistive loading circuit, which makes the input current a nonlinear signal, the loading circuit would generate a reversal current, leading to a shorting issue and making the rectification circuit fail. Or, when the input is an alternate current that has an extremely long period or a direct current, a floating connection bootstrap power supply would lose the performance of supplying power, leading to failure of the control circuit.

SUMMARY OF THE INVENTION

In view of the above problem, the present invention provides a rectification circuit for using in all types of linear and nonlinear input and loading, which comprises an input voltage, a bridge rectifier circuit, a loading circuit, a plurality of voltage level holding driving circuits, a current phase timing detection circuit, a plurality of high-voltage side and low-voltage side driving circuits, a plurality of input voltage phase timing detection circuits, a monostable circuit and a transistor conduction control circuit. The bridge rectifier circuit receives the input voltage. The loading circuit is electrically connected with the bridge rectifier circuit. The plurality of voltage level holding driving circuits re electrically connected with the bridge rectifier circuit to maintain a voltage level for conducting on the bridge rectifier circuit. The current phase timing detection circuit is electrically connected with the loading circuit and the bridge rectifier circuit to detect a current signal of an overall circuit. The plurality of high-voltage side and low-voltage side driving circuits are electrically connected with a plurality of voltage level holding driving circuits and generate at least one driving signal to the bridge rectifier circuit to cause the bridge rectifier circuit to operate according to the at least one driving signal. The plurality of input voltage phase timing detection circuits are electrically connected with the bridge rectifier circuit and the input voltage to adjust a peak value of the input voltage. The monostable circuit receives a clock signal. The transistor conduction control circuit receives output signals of the plurality of input voltage phase timing detection circuits, the monostable circuit, and the current phase timing detection circuit to generate at least one logic control signal to cause the plurality of high-voltage side and low-voltage side driving circuits to operate according to the at least one logic control signal, wherein the bridge rectifier circuit is operated according to a plurality of driving signals generated by the plurality of high-voltage side and low-voltage side driving circuits.

Based on the above description, the rectification circuit for using in all types of linear and nonlinear input and loading of the present invention detects both voltage conduction phase of an input signal and conduction phase of a current in an overall circuit to determine the conduction time of switch elements of a bridge rectifier circuit so that with a high performance being achieved, the bridge rectifier circuit is allowed to be used in various combinations of an input signal having a random waveform and linear or nonlinear circuits to further improve utilization efficiency of power supply and reduce complication of circuit design and also to prevent erroneous operation generated by the circuit. Further, the prior art uses a floating switch element drive circuit that requires an additional supply of voltage to serve as a power supply, but the present invention uses a built-in oscillation circuit or an externally supplied clock signal for driving, where the duty cycle is adjusted through a monostable circuit to drive an isolation transformer, without the use of an external power supply, so that even the input is an alternate current having an extremely long period, a direct current, or a random waveform, the operation can be carried out normally.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
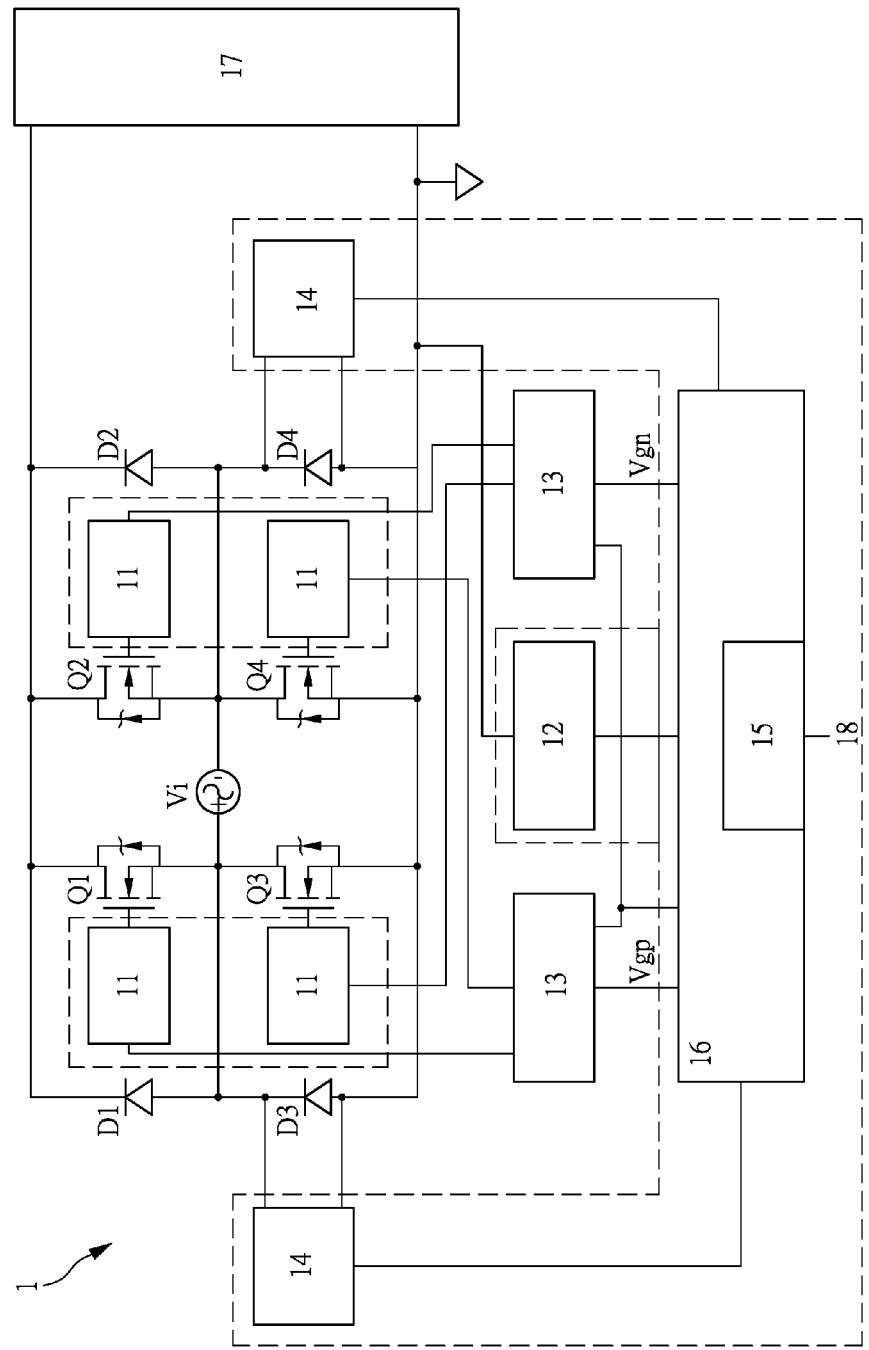
FIG. 1 is a block diagram of a rectification circuit for using in all types of linear and nonlinear input and loading according to the present invention.

Referring to FIG. 1, a block diagram of a rectification circuit for using in all types of linear and nonlinear input and loading according to the present invention is shown. The rectification circuit for using in all types of linear and nonlinear input and loading comprises an input voltage Vi, a bridge rectifier circuit (which is composed of MOSFETs Q1, Q2, Q3, Q4 and diodes D1, D2, D3, D4), a loading circuit 17, a plurality of voltage level holding driving circuits 11, a current phase timing detection circuit 12, a plurality of high-voltage side and low-voltage side driving circuits 13, a plurality of input voltage phase timing detection circuits 14, a monostable circuit 15, and a transistor conduction control circuit 16. The bridge rectifier circuit is electrically connected with the input voltage Vi and receives the input voltage Vi. The loading circuit 17 is electrically connected with the bridge rectifier circuit. The plurality of voltage level holding driving circuits 11 are electrically connected with the bridge rectifier circuit to maintain a voltage level for conduction of the bridge rectifier circuit. The current phase timing detection circuit 12 is electrically connected with the loading circuit 17 and the bridge rectifier circuit to detect a current signal in an overall circuit. The plurality of high-voltage side and low-voltage side driving circuits 13 are electrically connected with the plurality of voltage level holding driving circuits 11 and generate at least one driving signal to the bridge rectifier circuit to cause the bridge rectifier circuit to operate according to the at least one driving signal. The plurality of input voltage phase timing detection circuits 14 are electrically connected with the bridge rectifier circuit and the input voltage Vi to regulate a peak value of the input voltage Vi. The monostable circuit 15 receives a clock signal 18. The transistor conduction control circuit 16 receives output signals of the plurality of input voltage phase timing detection circuits 14, the monostable circuit 15, and the current phase timing detection circuit 12 to generate at least one logic control signal Vgp, Vgn to cause the plurality of high-voltage side and low-voltage side driving circuits 13 to operate according to the at least one logic control signal Vgp, Vgn, wherein the bridge rectifier circuit is operated according to a plurality of driving signals generated by the plurality of high-voltage side and low-voltage side driving circuits 13.

The bridge rectifier circuit comprises fours MOSFETs and didoes connected parallel with the four MOSFETs. The loading circuit 17 comprises a linear loading circuit or a nonlinear loading circuit, which is schematically shown as a resistor Rload and a capacitor Cload in FIG. 2A.

In a known circuit, detection is made for only the signal of the input voltage Vi; however, in the present invention, detection is further made for the current signal in the overall circuit. The current signal detected by the current phase timing detection circuit 12 is supplied, in combination with the input voltage signal detected by the plurality of input voltage phase timing detection circuits 14 and the output signal of the monostable circuit 15, to the transistor conduction control circuit 16 to generate the logic control signal Vgp, Vgn.

Figure 2A:
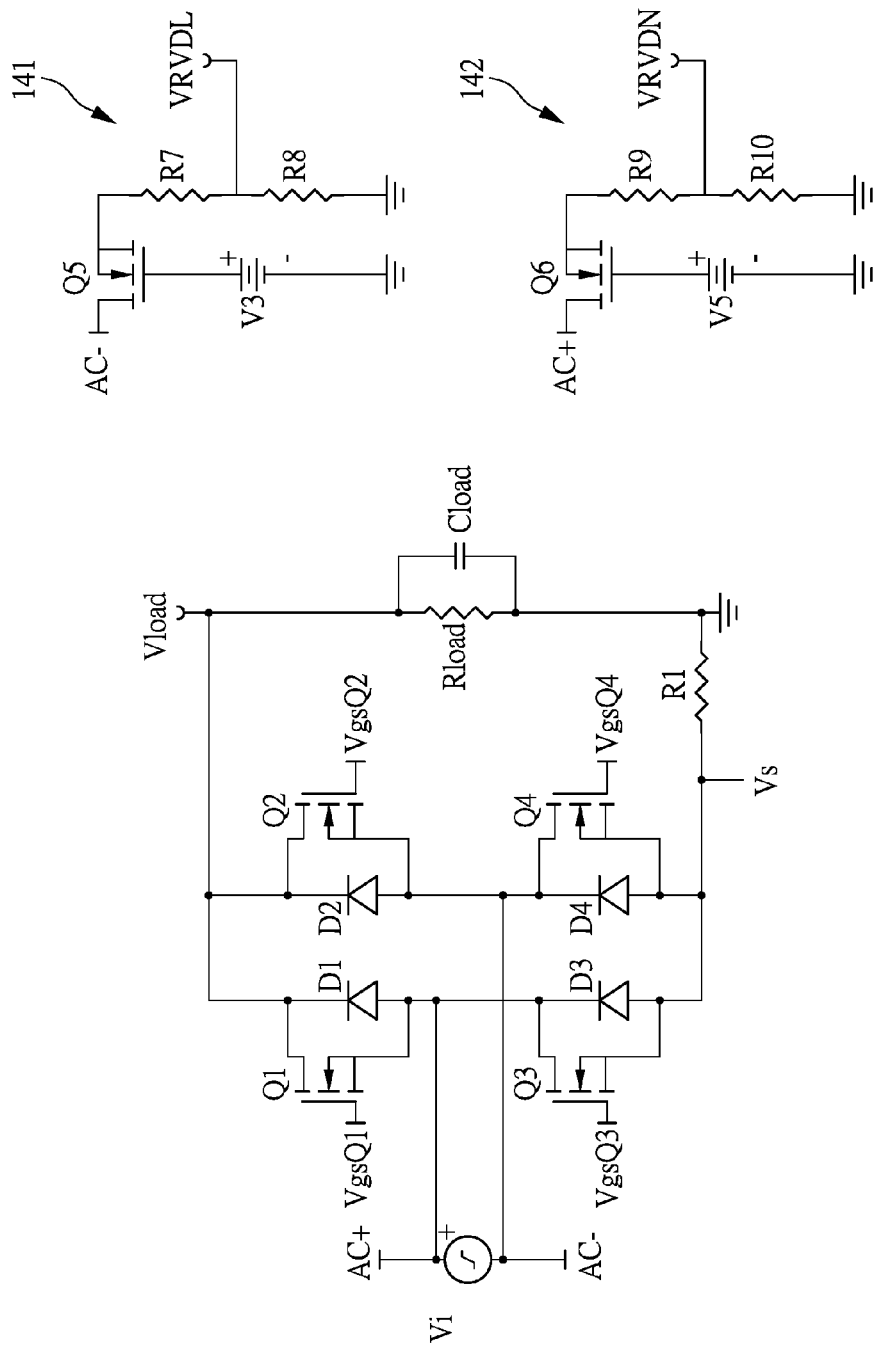
FIG. 2A is a circuit diagram of input voltage phase timing detection circuits.

Referring to FIG. 2A, a circuit diagram of the input voltage phase timing detection circuits is shown. For better understanding of the connection between the input voltage phase timing detection circuits 14 and the input voltage Vi and the bridge rectifier circuit, FIG. 2 provides, on the left-hand side, re-drawn input voltage Vi and bridge rectifier circuit. For simplification of the description, Zener diodes that are connected in parallel with each of the MOSFETs Q1, Q2, Q3, Q4 in FIG. 1 are omitted, while a resistor R1 that is not drawn in FIG. 1 is shown in FIG. 2A. Gate terminals of MOSFETs of the plurality of input voltage phase timing detection circuits 14 are connected to constant voltages V3, V5, and drain terminals are respectively connected to two ends of the input voltage Vi, namely the drain terminal associated with the first input voltage phase timing detection circuit 141 being connected to a positive terminal AC+ of the input voltage Vi and the drain terminal associated with the second input voltage phase timing detection circuit 142 being connected to a negative terminal AC− of the input voltage Vi. As such, through reduction of a conduction voltage of the MOSFETs Q5, Q6, a voltage is retrieved from sources terminals of the input voltage phase timing detection circuits 14 and fed to the transistor conduction control circuit 16. Further, the voltage phase timing detection circuits 14 retrieves a voltage through voltage division of the source terminal and feeds it to the transistor conduction control circuit 16. However, the design is not necessarily limited to voltage division and can be adjusted through resistors R7, R8, R9, R10 according to an actual circuit design. Further, the circuit shown in the drawing is provided for illustration only and is not intended to constrain the design of the voltage phase timing detection circuits 14 and any circuit that allows for adjustment of a peak value of an input voltage Vi is considered belonging to the scope of the voltage phase timing detection circuits 14, such as a voltage level shifting circuit.

Figure 2B:
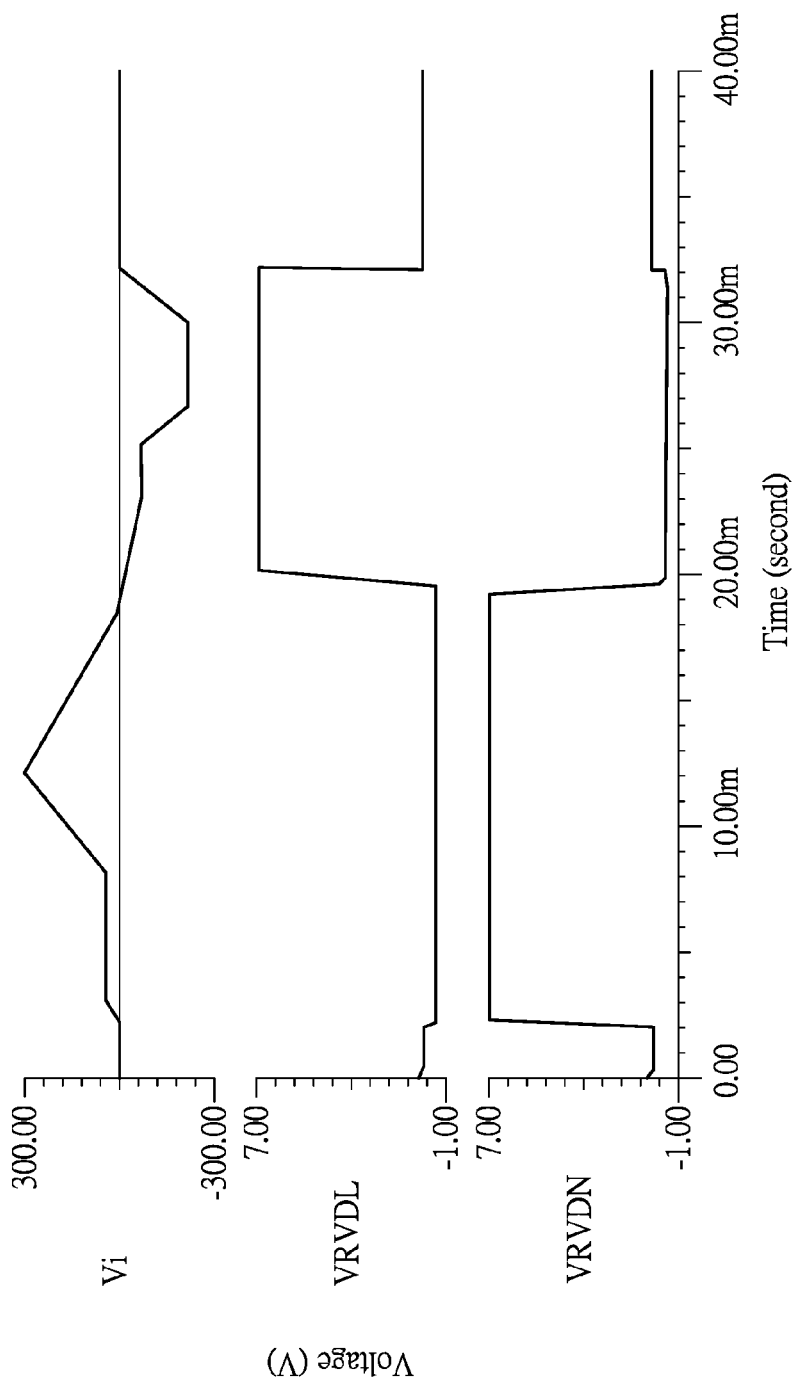
FIGS. 2B and 2C are timing diagrams of an input voltage and an output signal of the voltage phase clock detection circuits.
Figure 2C:
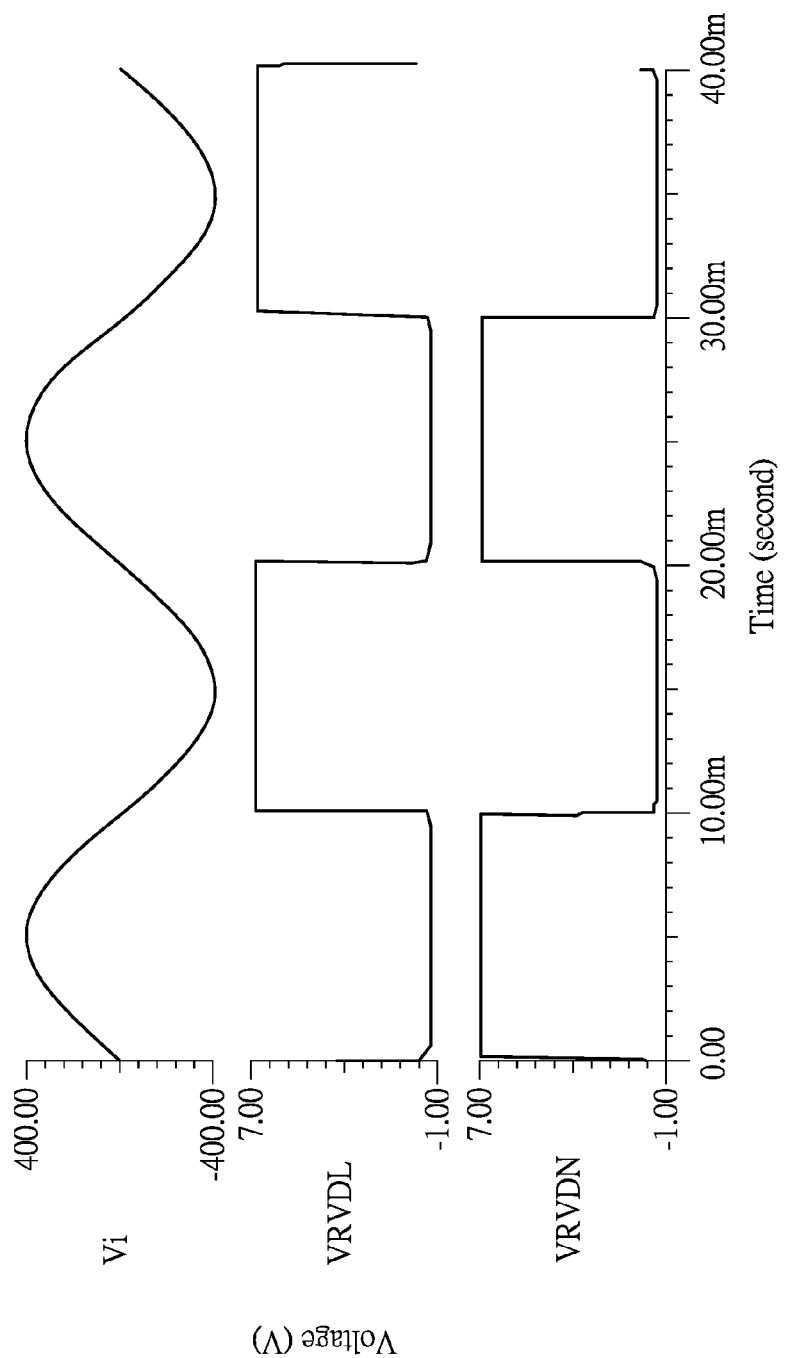

Referring to FIGS. 2B and 2C, which are timing diagrams of an input voltage and an output signal of the voltage phase timing detection circuits. Through the adjustment of the peak value Vi of the voltage phase timing detection circuits 14, the input voltage Vi is converted from a high voltage to a low voltage. For easy understanding of the variation of waveform, the drawings are not made to scale. In addition, it can be seen from FIG. 2B that the input voltage Vi is not limited to linear or nonlinear signals and can be a voltage an arbitrary linear or nonlinear waveform.

Figure 3A:
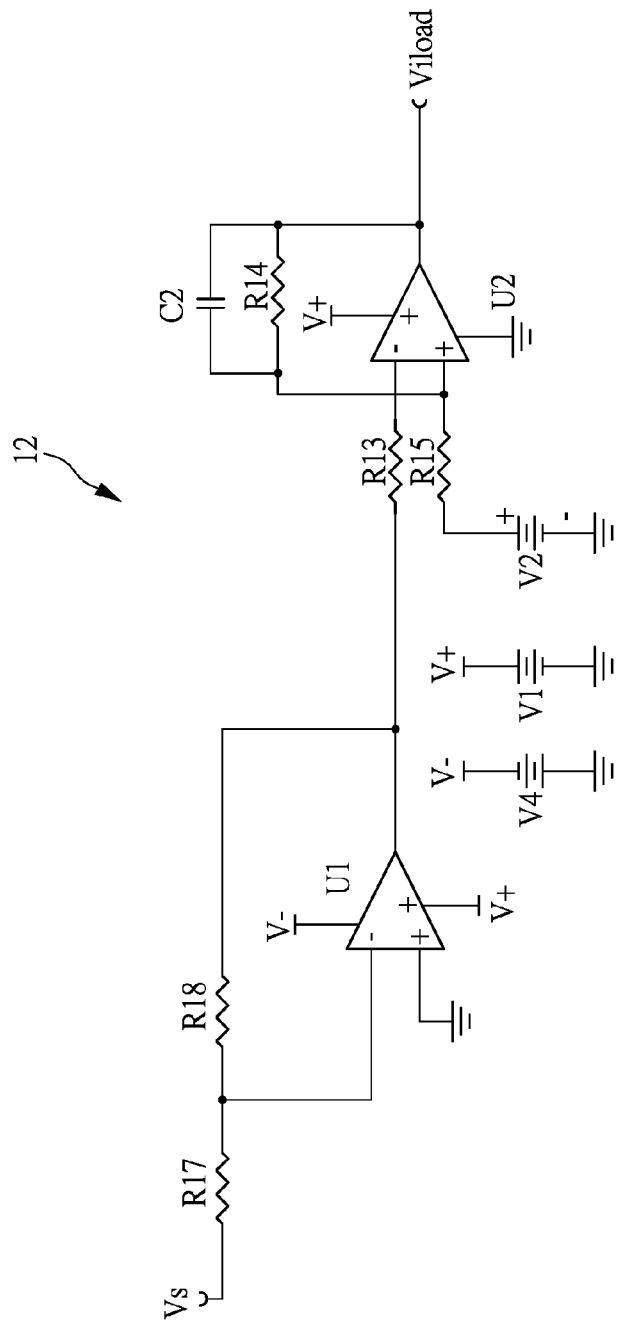
FIG. 3A is a circuit diagram of a current phase timing detection circuit.
Figure 3B:
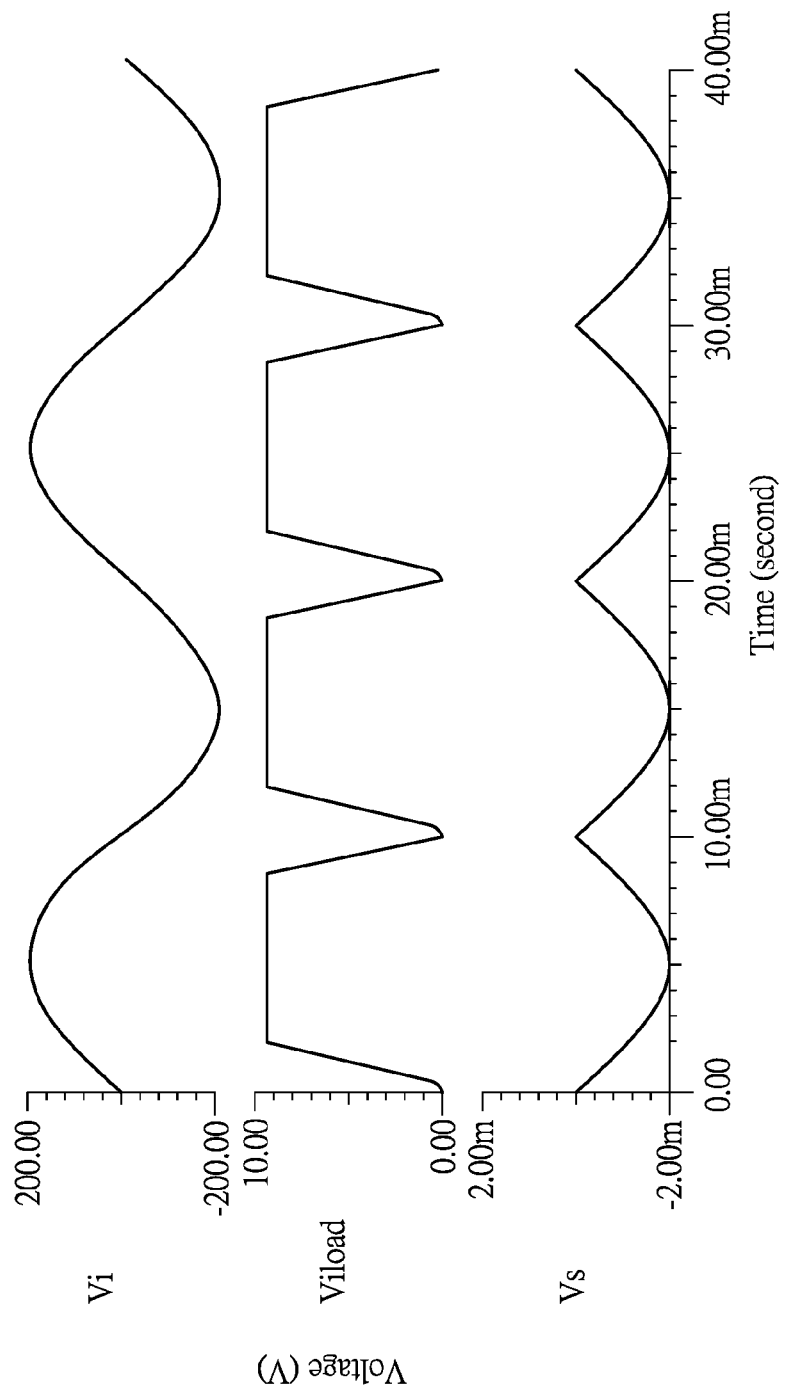
FIGS. 3B and 3C are timing diagram of an input signal, an output signal, and an input voltage of the current phase timing detection circuit.
Figure 3C:
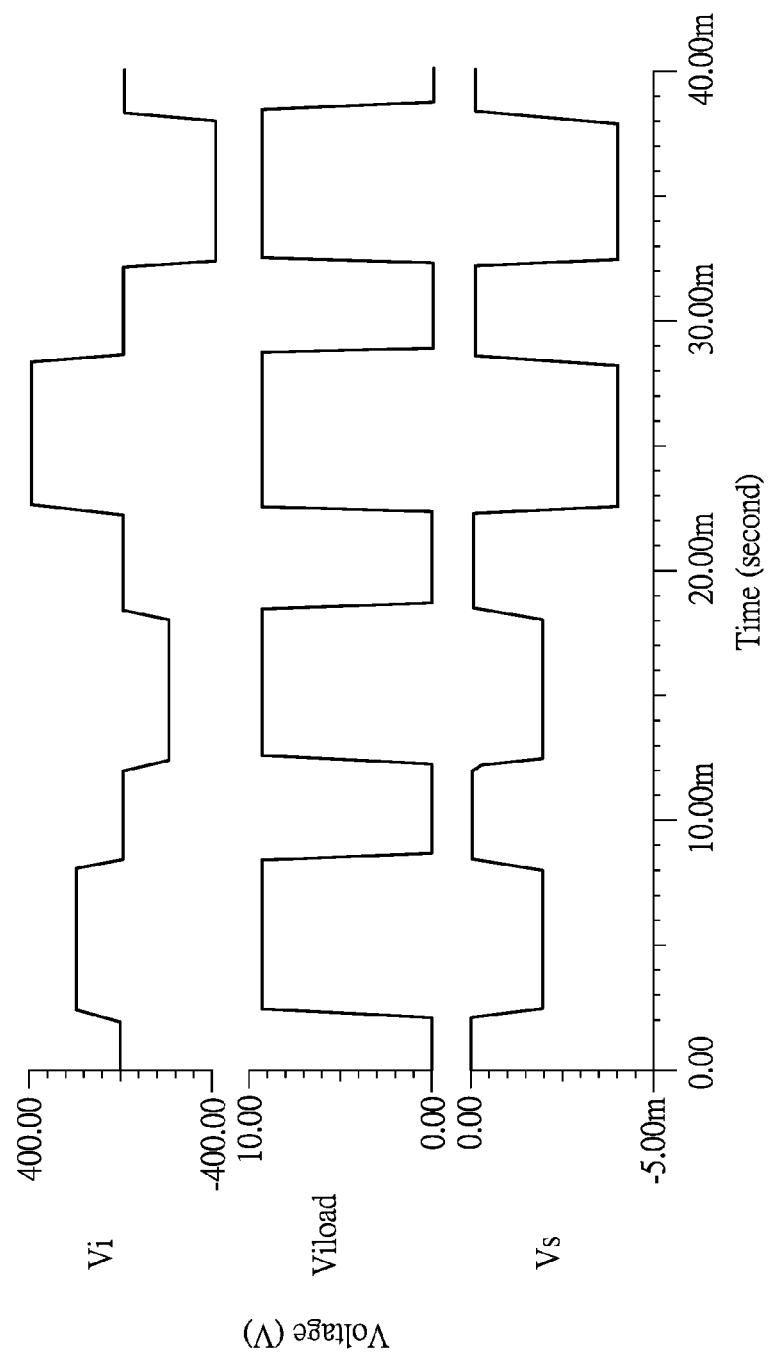

Referring to FIG. 3A, a circuit diagram of the current phase timing detection circuit is shown. FIGS. 3B and 3C are timing diagrams of an input signal, an output signal, and an input voltage of the current phase timing detection circuit. The current phase timing detection circuit 12 functions to amplify a detected current signal and has an input terminal Vs receiving the signal that is a detection signal from a regular transformer or a resistor and is connected to the bridge rectifier circuit (see FIG. 2A). The current signal, after being amplified with an amplifier U1, is compared by a comparator U2 and with a voltage V2 and an output terminal outputs a signal of voltage phase and conduction time to the transistor conduction control circuit 16. The current phase timing detection circuit 12 comprises resistors R13, R14, R15, R17, R18, a capacitor C2 and constant voltages V1, V2, V4, of which connections and detailed operations will not be described herein, where V+ and V− are the positive and negative terminals. Similarly, the circuit shown in the drawing is for illustration only and is not intended to limit the design of the current phase timing detection circuit 12. Any circuit that functions to amplify a current signal is considered belonging to the scope of the current phase timing detection circuit 12, such as a current detector.

Figure 4A:
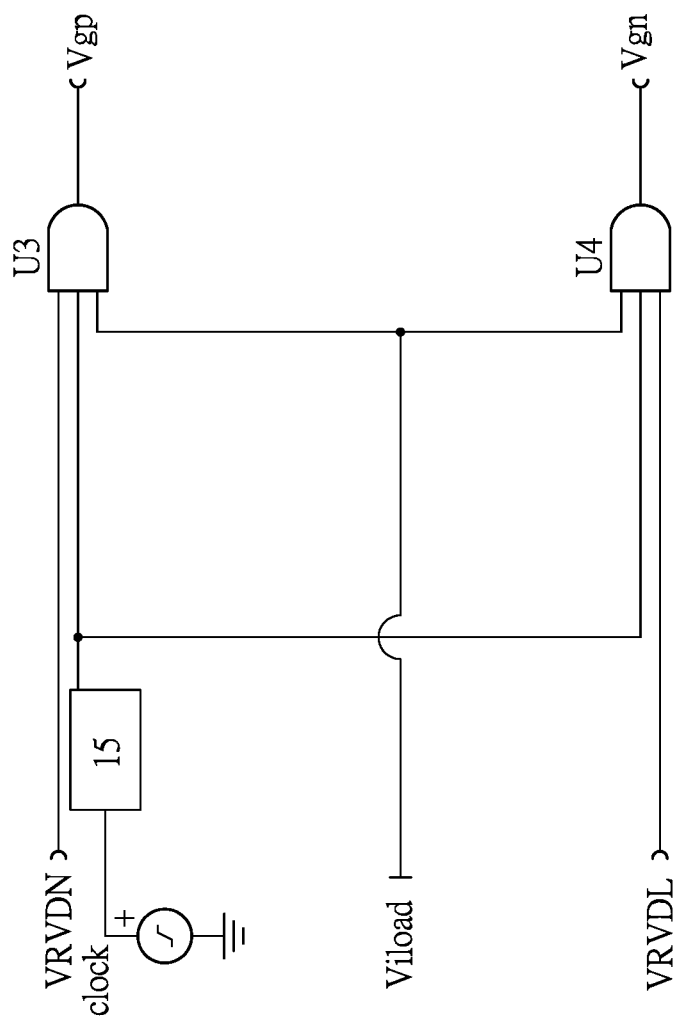
FIG. 4A is a logic circuit diagram of a transistor conduction control circuit.

Referring to FIG. 4A, a logic circuit diagram of the transistor conduction control circuit is shown. The transistor conduction control circuit 16 is made up of a plurality of logic AND gates U3, U4 and receives output signals VRVDN, VRVDL of the input voltage phase timing detection circuits 14, a signal of the monostable circuit 15, and an output signal Viload of the current phase timing detection circuit 12 to generate logic control signals Vgp, Vgn to the plurality of high-voltage side and low-voltage side driving circuits 13 to cause the plurality of high-voltage side and low-voltage side driving circuits 13 to operate according to at least one logic control signal Vgp, Vgn.

Figure 4B:
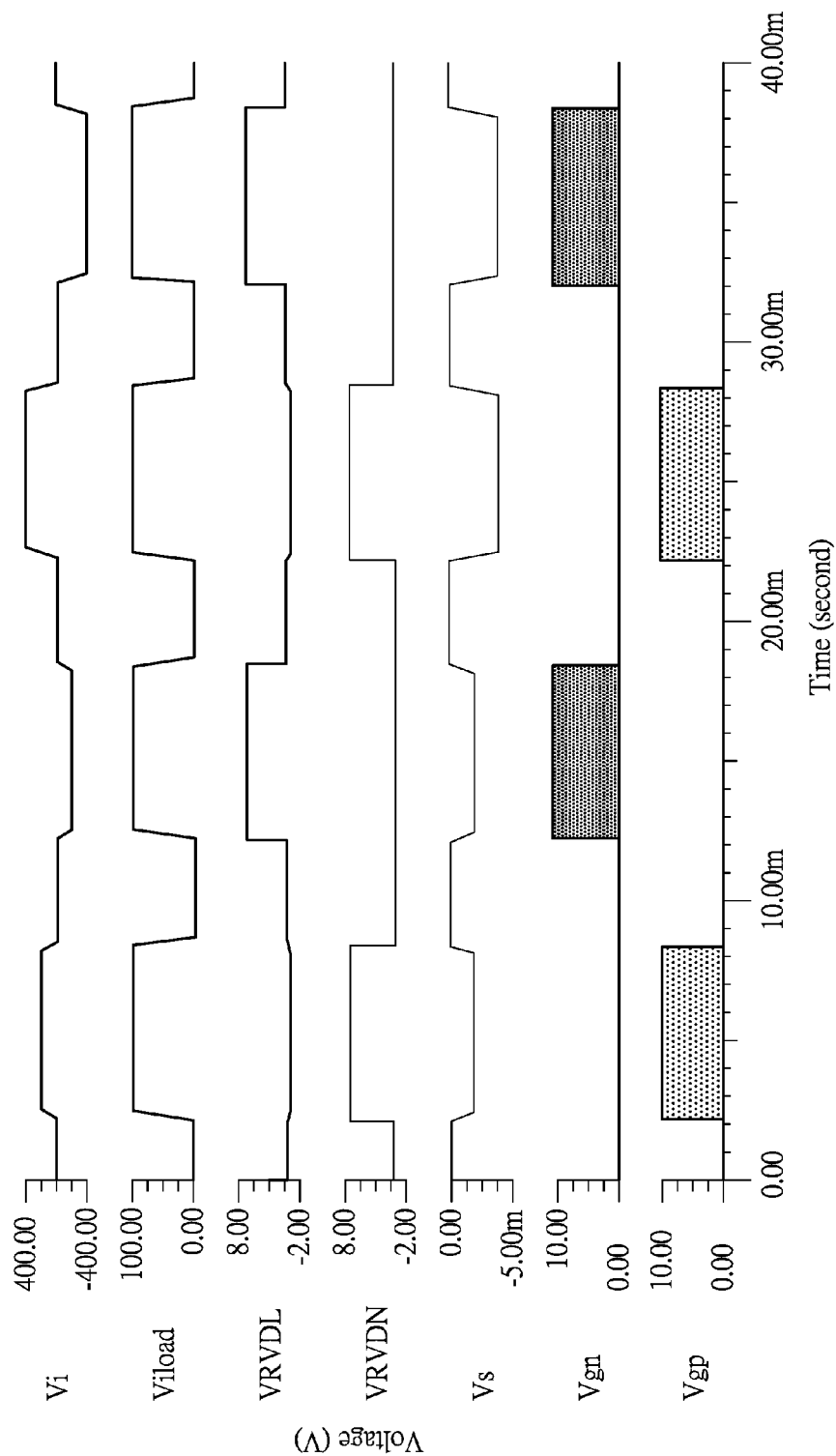
FIG. 4B shows timing diagrams of conduction phase of each signal.

FIG. 4B is a timing diagram of the conduction phase of each signal. These inputs being made to the logic AND gates U3, U4 of the transistor conduction control circuit 16 to generate the logic control signals Vgp, Vgn. Further, the monostable circuit 15 receives an input of a clock signal 18, which, compared to the frequencies (Hz) of other signals, is a high frequency (KHz) signal having a higher frequency, and is not shown in the drawing. The clock signal 18 is supplied from a signal generated by a square wave oscillation circuit or a loading circuit including a PWM signal. Since the signal from an external source or generated by the circuit of its own may not have a fixed duty cycle, the monostable circuit 15 is provided for regulating the duty cycle of the signal to a fixed one.

Figure 5A:
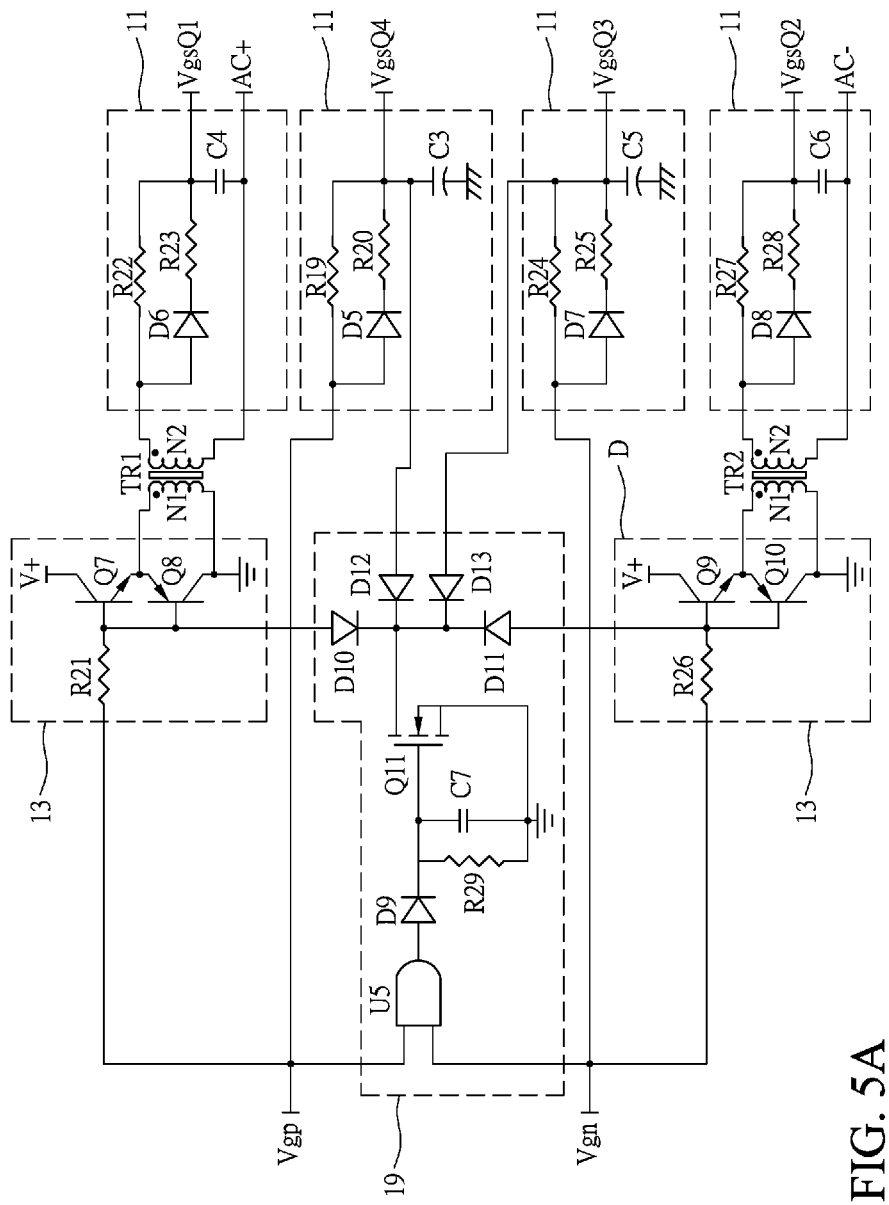
FIGS. 5A and 5B are respectively circuit diagram and block diagram of high-voltage side and low-voltage side driving circuits and voltage level holding driving circuits.
Figure 5B:
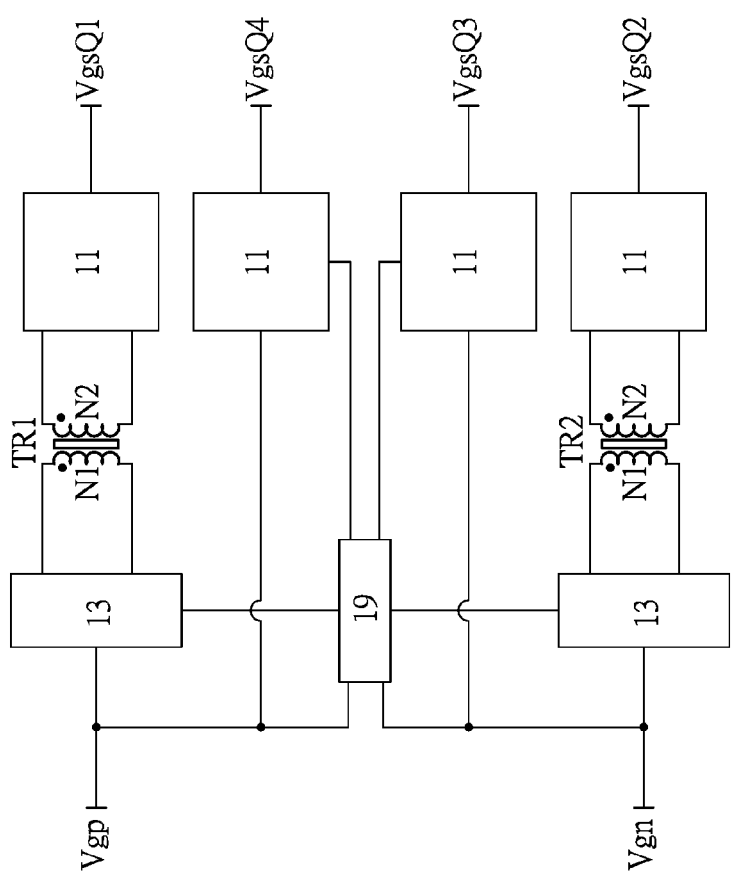

Referring to FIGS. 5A and 5B, a circuit diagram and a block diagram of the high-voltage side and low-voltage side driving circuits and the voltage level holding driving circuits are shown. The high-voltage side and low-voltage side driving circuits 13 have input terminals that receive the logic control signals Vgp, Vgn generated by the transistor conduction control circuit 16 in order to conduct on or shut down according to the levels of the logic control signals Vgp, Vgn. The plurality of voltage level holding driving circuits 11 are electrically connected with gate terminals of the four MOSEFTs Q1, Q2, Q3, Q4 of the bridge rectifier circuit, wherein the gate terminals respectively have voltages of VgsQ1, VgsQ2, VgsQ3, VgsQ4, so that the four MOSFETsQ1, Q2, Q3, Q4 are operated respectively according to at least one driving signal generated by the plurality of high-voltage side and low-voltage side driving circuits 13.

Further, in the circuit diagram of FIG. 5A, the logic control signal Vgp of a high signal level is taken as an example and the high-voltage side and low-voltage side driving circuits 13 are set on. Those having ordinary skills in the art may readily appreciate the operation of the high-voltage side and low-voltage side driving circuits 13 according to the connection made among all components (a logic AND gate U5, diodes D5-D13, transistors Q7-Q11, capacitors C3-C7, and resistors R19-R29) of the circuit so that detailed description will not be necessary herein. The voltage level holding driving circuits 11 function to maintain the level of conduction-on signal so that the MOSFETs Q1, Q2, Q3, Q4 of the bridge rectifier circuit respectively connected to the voltage level holding driving circuits 11 can be conducted on at any necessary time for conduction. For example, during a positive half cycle of the input signal Vi, the MOSFETs Q1, Q4 are conducted on and during a negative half cycle of the input signal Vi, the MOSFETs Q2, Q3 are conducted on.

Figure 5C:
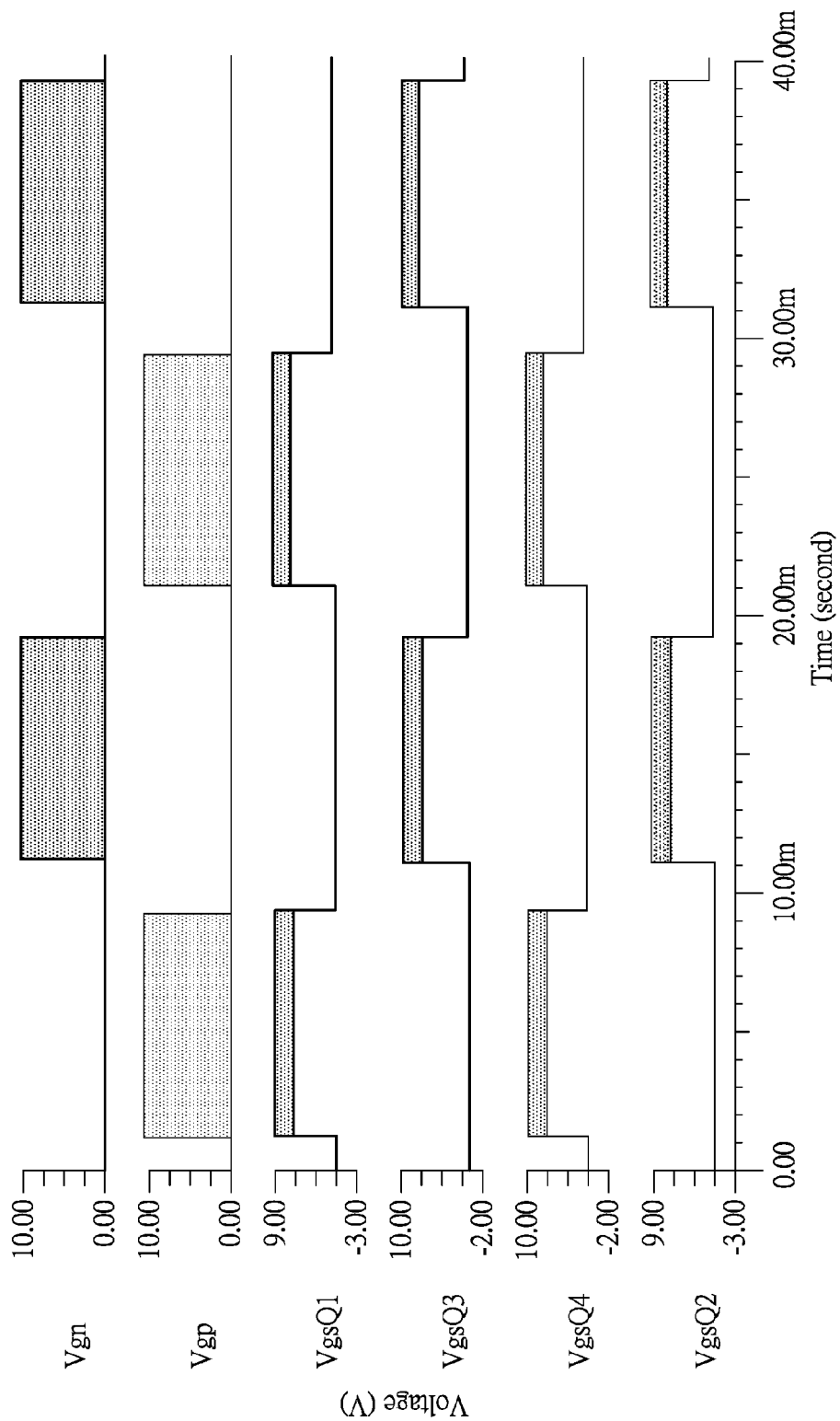
FIG. 5C is a timing diagram of conduction of a logic control signal and gate terminals of four MOSFETs of a rectifier circuit.

FIG. 5C is a conduction timing diagram of the logic control signal Vgp, Vgn and the gate voltages VgsQ1, VgsQ2, VgsQ3, VgsQ4 of the four MOSFETs Q1, Q2, Q3, Q4 of the rectification circuit. It can be seen from the drawing that the MOSFETs Q1, Q2, Q3, Q4 of the bridge rectifier circuit are only turned on at time corresponding to a level of the logic control signals Vgp, Vgn.

Further, the high-voltage side and low-voltage side driving circuits 13 and the voltage level holding driving circuits 11 are coupled to each other through for example conversion circuits TR1, TR2 of transformer and thus, there is no need for additionally providing electrical power external to the circuit. Further, taking the logic control signal Vgp as an example, the logic control signal Vgp, after passing through the high-voltage side and low-voltage side driving circuits 13, drives the conversion circuit TR1 and is transformed as a signal from an N1 side (the side associated with the high-voltage side and low-voltage side driving circuits 13) of the conversion circuit TR1 to an N2 side (the side associated with the voltage level holding driving circuits 11) to provide a level of the signal that drives the MOSFET Q1 of the bridge rectifier circuit connected thereto, while at another terminal, the logic control signal Vgp that does not undergo transformation through the conversion circuit TR1 is allowed to pass through the voltage level holding driving circuits 11 to directly drive the MOSFET Q4 of the bridge rectifier circuit connected thereto. Thus, the present invention does not need to use a floating voltage supply as a power supply for driving the bridge rectifier circuit. In other words, there is no need to supply driving power at the side of transistors Q1 and Q2.

Further, the rectification circuit for using in all types of linear and nonlinear input and loading may further comprise a disable circuit 19, which is electrically connected with the plurality of high-voltage side and low-voltage side driving circuits 13 and receives at least one logic control signal Vgp, Vgn of the transistor conduction control circuit 16 to generate at least one disable signal to cause the plurality of high-voltage side and low-voltage side driving circuits 13 to stop operation according to the at least one disable signal so as to prevent the MOSFETs Q1, Q2, Q3, Q4 of the bridge rectifier circuit from conducting on any one of the MOSFETs that does not to be conducted on when interfered with by an external signal and also to prevent shorting between the MOSFETs Q1, Q3 and the MOSFETs Q2, Q4. Thus, the disable circuit 19 provides a function of circuit protection. Similarly, the operation associated with signals of other levels can be easily appreciated by those having ordinary skills in the art, who may get aware of the operation of the disable circuit 19 from the circuit diagram to determine if diabling the high-voltage side and low-voltage side driving circuits 11, 13 electrically connected therewith and further details will be omitted herein.

In summary, the present invention provides a rectification circuit for using in all types of linear and nonlinear input and loading, which detects both voltage conduction phase of an input signal and conduction phase of a current in an overall circuit to determine the conduction time of switch elements of a bridge rectifier circuit so that with a high performance being achieved, the bridge rectifier circuit is allowed to be used in various combinations of an input signal having a random waveform and linear or nonlinear circuits to further improve utilization efficiency of power supply and reduce complication of circuit design and also to prevent erroneous operation generated by the circuit. Further, the prior art uses a floating switch element drive circuit that requires an additional supply of voltage to serve as a power supply, but the present invention uses a built-in oscillation circuit or an externally supplied clock signal for driving, where the duty cycle is adjusted through a monostable circuit to drive an isolation transformer, without the use of an external power supply, so that even the input is an alternate current having an extremely long period, a direct current, or a random waveform, the operation can be carried out normally.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A rectification circuit for using in all types of linear and nonlinear input and loading, comprising:
    an input voltage;
    a bridge rectifier circuit, which receives the input voltage;
    a loading circuit, which is electrically connected with the bridge rectifier circuit;
    a plurality of voltage level holding driving circuits, which are electrically connected with the bridge rectifier circuit to maintain a voltage level for conducting on the bridge rectifier circuit;
    a current phase timing detection circuit, which is electrically connected with the loading circuit and the bridge rectifier circuit to detect a current signal of an overall circuit;
    a plurality of high-voltage side and low-voltage side driving circuits, which are electrically connected with the plurality of voltage level holding driving circuits and generate at least one driving signal to the bridge rectifier circuit to cause the bridge rectifier circuit to operate according to the at least one driving signal;
    a plurality of input voltage phase timing detection circuits, which are electrically connected with the bridge rectifier circuit and the input voltage to adjust a peak value of the input voltage;
    a monostable circuit, which receives a clock signal; and
    a transistor conduction control circuit, which receives output signals of the plurality of input voltage phase timing detection circuits, the monostable circuit, and the current phase timing detection circuit to generate at least one logic control signal to cause the plurality of high-voltage side and low-voltage side driving circuits to operate according to the at least one logic control signal;
    wherein the bridge rectifier circuit is operated according to a plurality of driving signals generated by the plurality of high-voltage side and low-voltage side driving circuits.

2. The rectification circuit for using in all types of linear and nonlinear input and loading as claimed in claim 1, wherein the current phase timing detection circuit comprises a current detector.

3. The rectification circuit for using in all types of linear and nonlinear input and loading as claimed in claim 1, wherein the input voltage comprises a voltage of an arbitrary waveform.

4. The rectification circuit for using in all types of linear and nonlinear input and loading as claimed in claim 1, wherein the loading circuit comprises a linear loading circuit or a nonlinear loading circuit.

5. The rectification circuit for using in all types of linear and nonlinear input and loading as claimed in claim 1 further comprising a disable circuit, which receives the at least one logic control signal of the transistor conduction control circuit to generate at least one disable signal to cause the plurality of high-voltage side and low-voltage side driving circuits to stop operation according to the at least one disable signal.

6. The rectification circuit for using in all types of linear and nonlinear input and loading as claimed in claim 1, wherein the bridge rectifier circuit comprises four MOSFETs and diodes connected in parallel to the four MOSFETs.

7. The rectification circuit for using in all types of linear and nonlinear input and loading as claimed in claim 6, wherein the plurality of voltage level holding driving circuits are electrically connected with gate terminals of the four MOSFETs to cause the four MOSFETs to respectively operate according to the at least one driving signal generated by the plurality of high-voltage side and low-voltage side driving circuits.

8. The rectification circuit for using in all types of linear and nonlinear input and loading as claimed in claim 1 further comprising a conversion circuit, which couples the plurality of high-voltage side and low-voltage side driving circuits and the plurality of voltage level holding driving circuits to each other.

* * * * *